United States Patent [19]

Morrison

[11] 4,123,138
[45] Oct. 31, 1978

[54] OPTICAL FIBER CONNECTOR

[75] Inventor: Robert J. Morrison, Canoga Park, Calif.

[73] Assignee: Hughes Aircraft Company, Culver City, Calif.

[21] Appl. No.: 794,289

[22] Filed: May 5, 1977

[51] Int. Cl.² .............................................. G02B 5/14
[52] U.S. Cl. ..................... 350/96.21; 285/DIG. 12; 403/223; 403/291
[58] Field of Search ................. 350/96 C, 96 R, 96 B, 350/96.20, 96.21, 96.22, 96.10; 285/260, DIG. 12; 403/223, 291, 300, 353

[56] References Cited

U.S. PATENT DOCUMENTS

| 3,363,450 | 1/1968 | Simpkins et al. | 403/300 |
| 3,984,172 | 10/1975 | Miller | 350/96 C |

FOREIGN PATENT DOCUMENTS 2,557,660 7/1976 Fed. Rep. of Germany ........ 350/96 C

OTHER PUBLICATIONS

C. G. Someda "Simple, Low-Loss Joints Between Single-Mode Optical Fibers" Bell System Tech. Jour. vol. 52, No. 4, Apr. 73.

*Primary Examiner*—John K. Corbin
*Assistant Examiner*—Stewart Levy
*Attorney, Agent, or Firm*—Donald C. Keaveney; W. H. MacAllister

[57] ABSTRACT

There is disclosed an optical fiber connector for use in glass fiber waveguide transmission systems to provide either a permanent splice or a fiber guide connection which can be disengaged. The connector comprises a sheet of elastically deformable material such as a plastic having opposed major plane surfaces. At least one hole is formed in the material which hole has the same shape and dimension as the fiber portions which are to be inserted into opposite ends of the hole and aligned and joined therein. The hole extending through the sheet of material is parallel to one of its major plane surfaces and is positioned to be nearer to this one surface than to the other surface of the material so that when the material is bent along the axial direction of the hole the hole deforms or elongates to permit removal or insertion of fiber ends to be aligned and held securely therein when the deformation is released and the material goes back to its original shape.

6 Claims, 5 Drawing Figures

OPTICAL FIBER CONNECTOR

BACKGROUND OF THE INVENTION

The development of the use of glass fiber waveguides to replace copper wires for carrying voice, data, or video signals in telecommunications systems is traced and described in an article entitled, "Photons in Fibers for Telecommunication" by Stewart E. Miller of Bell Telephone Laboratories which appeared beginning at page 1211 in the Mar. 18, 1977 issue of "Science" magazine, Vol. 195. A more complete discussion of this topic may be found in the book entitled, "Fundamentals of Optical Fiber Communications" which was edited by Michael K. Barnoski of the Hughes Research Laboratories and which was published by Academic Press of New York in 1976. Chapter 3 of this book deals with "Coupling Components for Optical Fiber Waveguides" and describes the requirements and problems inherent in such devices.

In the Miller article beginning at page 1211, the author states with reference to elementary fiber links that, "The optical portions of all such systems are similar and simple; they consist of a carrier generator (laser or LED), fiberguide cable, envelope detector "simple semiconductor-juncton (PIN) or avalanching photodiode], and conventional electronics to drive the carrier generator and to follow the detector. The information rate or bandwidth required on the link, in combination with the desired link length, lead to the choice between laser or LED and to selection of one of the fiber types described below.

Two slightly different kinds of glass are used for the core and the cladding of fibers, giving the core a slightly higher index of refraction than the cladding. The electromagneticwave modes guided in the core have fields that decay radially the cladding; with appropriate cladding thickness, very little influence on core modes is produced by the wave properties of the jacket or regions exterior to the jacket. Single-mode guidance is obtained with a core diameter of about 5 micrometers and an index difference between core and cladding of about 0.5 percent. Multimode fibers are necessary for carrying significant amounts of power from a LED; typical core diameters are in the 50- to 75-$\mu$m range with an index difference of 1 or 2 percent."

Later at page 1213, in discussing fiber connectors and splicing, the author states, "More new structures are required in fiberguide transmission systems to provide both permanent splices and fiberguide connections which can be disengaged. The background of theory can be summarized as follows: The requirement on transverse alignment of the fiber ends is about 0.2 core radius for approximately 0.2 db loss. For single-mode fibers, 0.2 core radius is about 1 $\mu$m, a requirement that is likely to meet. For that reason, single-mode fibers are likely to be used only where the single-mode performance is essential.

Longitudinal end separation can be on the order of a core radius for about 0.1 db loss (with a bridging fluid or solid at the joint), so this requirement is not as critical as that for the transverse alignment, especially for multimode fibers where the core radius is about 25 $\mu$m."

It can be seen from the above that transverse axial alignment of the two ends of a fiber to be joined in a connector is the most critical and difficult thing to achieve.

It is an object of the present invention to provide a simple, self-aligning one-piece molded connector for use with single or multi-mode optical fibers.

It is a further object of this invention to provide such a connector which is self-aligning and holds fibers securely in position axially.

SUMMARY OF THE INVENTION

This is achieved by providing a sandwich of two thicknesses of plastic, a fiber or fiber duplicating mandrel, and another thickness of plastic sheet which are placed in a laminating press. The operation of the press fuses the plastic into one piece which encapsulates the fiber or mandrel. Since the plastic is thinner on top, when the plastic is bent along the fiber, the hole deforms or elongates permitting removal of the fiber. Now, when a fiber is inserted from each end and the plastic flattened out, the sides press the fibers into alignment and hold them there.

BRIEF DESCRIPTION OF THE DRAWINGS

These and other features, objects and advantages of the invention will be better understood from a consideration of the detailed description below taken in conjunction with the accompanying drawings wherein like reference characters refer to like parts throughout and in which.

DETAILED DESCRIPTION OF THE DRAWING

Exemplary embodiments of the invention are shown in FIGS. 1-4 and FIG. 5 of the drawings.

Figure 1:
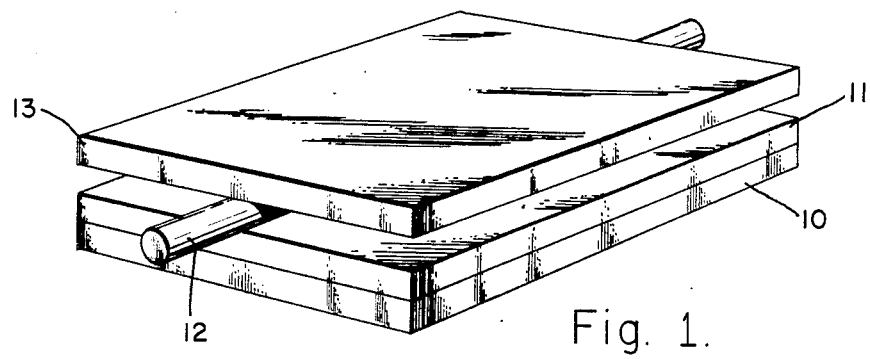
FIG. 1 is a perspective view of the starting materials from which the device of the present invention is made before they are laminated.

In FIG. 1, a sandwich of two thicknesses 10 and 11 of a plastic material on top of which is placed a fiber optic waveguide 12 and then another thickness 13 of the plastic material is assembled and then placed in a laminating press. The plastic material of sheets 10, 11 and 13 may for example be a calendar vinyl often referred to as a badge plastic which is obtainable from Laminex, Inc. of Los Angeles, California. Of course, it will be understood that other fusable plastics may be used. In the particular exemplary embodiment being described, each of the plastic sheets 10, 11 and 13 had a thickness of 0.015 inch and the dimensions of the major plane surfaces of the sheet were about ¾ of an inch wide by 1-½ inches long. The fiber waveguide 12 was a multi-mode glass fiber optic waveguide having an outer diameter of 0.005 inches. Of course, it will be understood that in practice a mandrel comprising a stainless steel wire of the same diameter as the fiber optic waveguide for which the device is being fabricated could also be used in place of the fiber itself.

Any conventional laminating press such as those used for forming plastic badges and the like may be used to fabricate the device. For the particular plastic and sheet size being described in this example and using such a screw tightened plastic badge press, the laminating time was about five minutes at a temperature of about 220° F.

Figure 2:
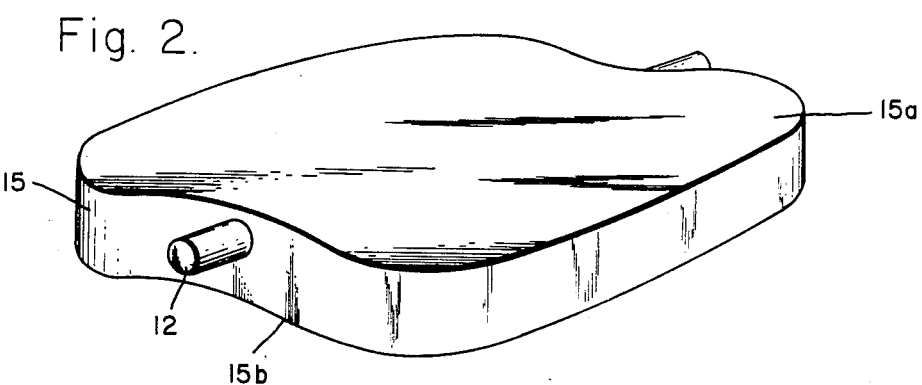
FIG. 2 is a perspective view of the device which results from laminating the starting materials of FIG. 1.

The pressure and heat of the press softens, compresses and fuses the plastic sheets into one piece 15 which encapsulates the fiber 12 as seen in FIG. 2 which is a view of the device after its removal from the press.

Figure 3:
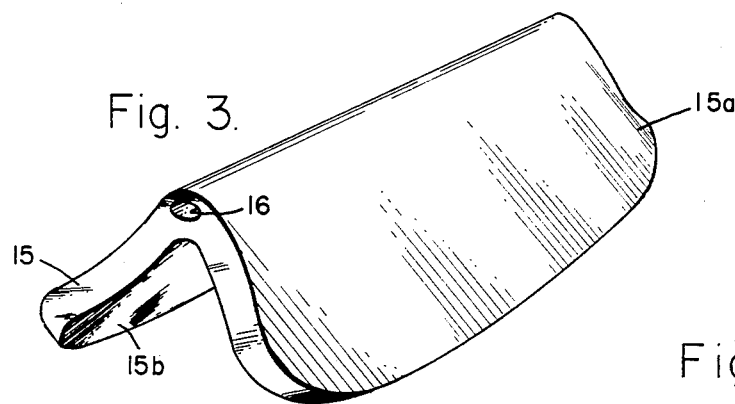
FIG. 3 is a perspective view of the device of FIG. 2 which has been bent so as to remove the fiber from the connector.
Figures 4, 5:
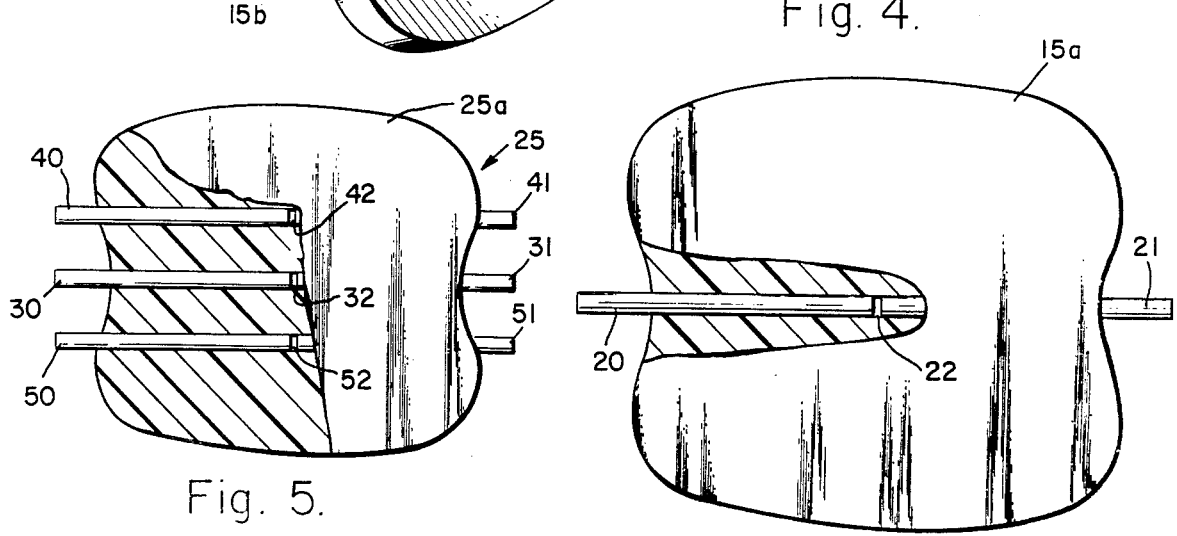
FIG. 4 is a plan view, partly broken away, showing the mode of operation of the connector of the present invention.
FIG. 5 is a plan view similar to FIG. 4 but showing a plural fiber connector.

Since the plastic is thinner near its top surface 15a then it is near its bottom surface 15b (that is to say, since the distance from the top of the fiber 12 to the top surface 15a is less than the distance from the bottom of the fiber 12 to the bottom surface 15b), when the plastic is bent along the fiber axis as shown in FIG. 3 the hole 16 deforms and elongates and allows removal of the fiber 12 or its mandrel if a mandrel is used.

Now, fibers 20 and 21 are inserted from opposite ends of the hole 16 extending through the plastic with the device in the position shown in FIG. 3. Then when the plastic is flattened out to the position shown in FIG. 4, the sides of the hole press the fibers into transverse axial alignment and hold them there. The butt coupling joint 22 so formed may either be simply a butt joint in air or it may be provided with index matching fluid.

In the particular exemplary device described above which has been built and tested, the coupling loss using multi-mode fiber without index matching fluid was −2.96dB, and with index matching fluid it was −0.89dB. It will, of course, be understood that these losses are for a first prototype device and more careful fabrication techniques should reduce even these figures.

It will also be understood that many variations of the basic idea are possible. For example, the sheets 10 and 11 could initially be a single sheet of twice the thickness of sheet 13. Many different forms of plastic could also be used. Furthermore, although the exemplary device is fabricated for a single fiber waveguide 12, it is apparent that a plurality of such waveguides in parallel positions could be used to fabricate a coupler for a ribbon or tape array comprising a plurality of parallel positioned fiber waveguides. In such an arrangement, of course, the tape holding the plurality of fibers in the ribbons to be spliced would first be peeled back much in the same way that insulation is peeled back from a wire before the fiber waveguides were inserted into the completed coupler. Such a coupler 25 is shown in plan view in FIG. 5 wherein the top surface 25a is broken away to show the butt joints 32, 42 and 52, respectively, of fibers 30 and 31, 40 and 41, and 50 and 51. In use, such a device is bent on the arc of a circle rather than simply along a single axis. It is otherwise the same as the device of FIG. 1.

What is claimed is:

1. An optical fiber connector for joining fiber waveguide portions comprising:
    (a) a sheet of elastically deformable material having opposed major plane surfaces;
    (b) said material having at least one hole formed therein, said hole having the same shape and dimensions as the fiber portions to be aligned and joined by said connector;
    (c) said hole extending through said sheet of material parallel to one of said major plane surfaces thereof and positioned to be nearer to said one surface than to the other surface thereof so that when said material is bent along the axial direction of said hole, the hole deforms to permit removal or insertion of said fiber portions.

2. A connector as in claim 1 wherein said sheet of material comprises a plastic.

3. A device as in claim 1 having a plurality of holes formed therein, each of said holes having the same shape and dimension as the fiber portions to be aligned and joined by said connector; and
    each of said holes extending through said sheet of material parallel to each other and parallel to one of said major plane surfaces thereof and positioned to be nearer to said one surface than to other surface thereof so that when said material is bent along the axial direction of said hole, the hole deforms to permit removal or insertion of said fiber portions.

4. A connector as in claim 2 which is formed by placing a double thickness of plastic sheet material, a non-deformable hole defining member having the same shape and dimensions as said fiber, and a single thickness of plastic sheet material stacked one on top of another in a laminating press so that the pressure and heat resulting from operation of the press softens, compresses and fuses the plastic into one piece which encapsulates the hole defining member, said hole defining member being removed from said plastic after said plastic is removed from said press by bending said plastic to deform said hole.

5. A device as in claim 2 wherein said plastic material is a calendar vinyl.

6. A device as in claim 4 wherein the diameter of said hole defining member is about 0.005 inches and the thickness of said single thickness of plastic sheet material is about 0.015 inches.

* * * * *